Jan. 4, 1955  L. B. BOS  2,698,867
HYDROXY AROMATIC HYDROCARBON-OLEFIN POLYMER
ALKYLATION WITH HF CATALYST
Filed Feb. 11, 1950
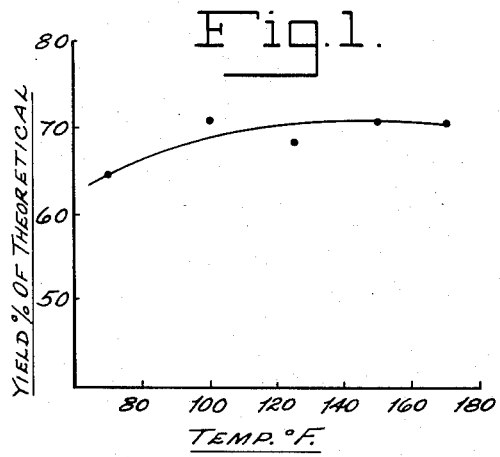
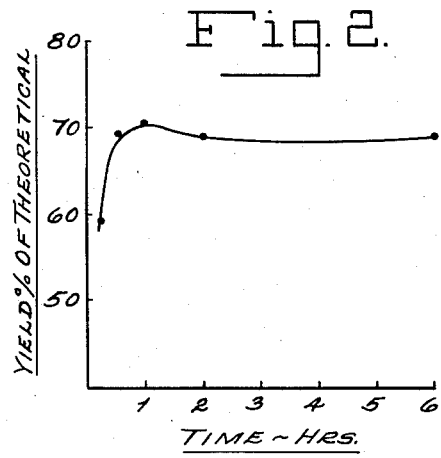
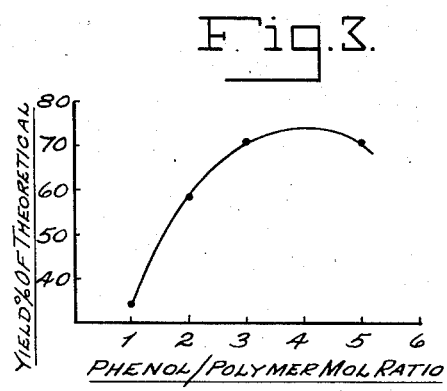
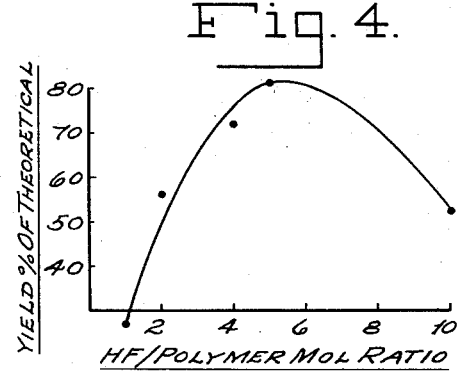
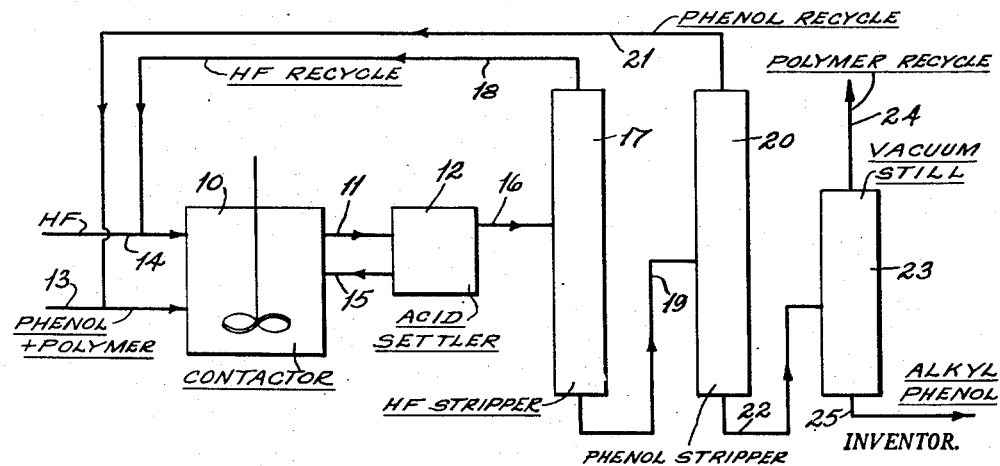
INVENTOR.
LOUIS B. BOS
BY
ATTORNEYS

United States Patent Office 2,698,867
Patented Jan. 4, 1955

2,698,867

HYDROXY AROMATIC HYDROCARBON-OLEFIN POLYMER ALKYLATION WITH HF CATALYST

Louis B. Bos, Beacon, N. Y., assignor to The Texas Company, New York, N. Y., a corporation of Delaware Application February 11, 1950, Serial No. 143,784

1 Claim. (Cl. 260—624)

This invention relates to the manufacture of high molecular weight alkylated hydroxy aromatic compounds, such as alkyl phenols, by the alkylation of a hydroxy aromatic hydrocarbon with an olefin polymer having 18 to 30 carbon atoms in the molecule in the presence of HF catalyst.

Alkylated hydroxy aromatic compounds, such as alkyl phenols, having one or more high molecular weight alkyl side chains substituted on the ring, are valuable intermediates in the preparation of lubricating oil additives and sulfonated detergents. The alkyl phenols of the present invention are particularly useful in the preparation of magnesium and zinc alkyl phenolates employed as lubricating oil additives as disclosed and claimed in the copending application of Frederic C. McCoy, Bill L. Benge, Edwin C. Knowles and Charles C. Towne, Serial No. 286,634 filed May 7, 1952, now Patent Number 2,674,577 as a continuation-in-part of Serial No. 143,836, filed February 11, 1950, now abandoned.

The use of most conventional alkylation catalysts, such as sulfuric acid and aluminum chloride, has not proved attractive for the alkylation of phenols with olefin polymers having 18 to 30 carbon atoms in the molecule, since low yields of the order of 20–35% by weight on the basis of theoretical are obtained, and the resulting alkyl phenol products have given metallic alkyl phenolates of inferior quality as lubricating oil additives.

One of the principal objects of the present invention is to provide an improved process of alkylating a hydroxy aromatic hydrocarbon, such as a phenol, with a high molecular weight olefin polymer of this character in order to produce alkylated products with high molecular weight alkyl side chains in good yield and of satisfactory quality for the preparation of metallic alkyl phenolate additives for lubricating oil and other uses.

Other objects and advantages of the present invention will be apparent from the following description taken in conjunction with the attached drawing and appended claims.

In the attached drawing, Figs. 1–4 are plots illustrating the critical operating conditions for carrying out the alkylation reaction in accordance with the present invention; and Fig. 5 is a diagrammatic view of apparatus suitable for carrying out the alkylation method.

It has now been discovered that a substantially anhydrous HF liquid constitutes an unusually effective catalyst for carrying out this hydroxy aromatic hydrocarbon-olefin polymer alkylation reaction when certain critical conditions of operation are employed. The critical conditions include a temperature of about 100–175° F., preferably about 125–150° F.; a hydroxy aromatic hydrocarbon to olefin polymer mol ratio of about 2:1 to 6:1, preferably about 3:1 to 4:1; an HF to olefin polymer mol ratio of about 3:1 to 8:1, preferably about 4:1 to 5:1, and a reaction time of at least about ½ hour; preferably about ½ to 1 hour. Under these conditions, yields of good quality alkylated product of the order of 65–80% or more of theoretical are readily obtained. The catalyst is readily recovered from the reaction mix by distillation, or settling to remove the bulk of the catalyst followed by distillation to effect further recovery, in yields up to about 98% or more based on the catalyst charged; and this recovered catalyst is fully effective for reuse in the process. The excess and unreacted phenol can be removed from the product by distillation or water washing. The final alkylated product is obtained as the residue of high vacuum distillation at 1–2 mm. mercury absolute pressure up to temperatures about 50° C. higher than the end boiling point of the olefin polymer employed.

Any suitable hydroxy aromatic hydrocarbon can be employed as a starting material for purposes of the present invention. The preferred material from the standpoint of producing an intermediate for lubricating oil additive manufacture is a mononuclear monohydroxy aromatic hydrocarbon, such as phenol, cresol, xylenol or other alkyl phenol. Also mononuclear polyhydroxy aromatic hydrocarbons, such as hydroquinone, pyrogallol and other dihydric and trihydric phenols, can be employed. All of the foregoing mononuclear hydroxy aromatic hydrocarbons are generically referred to herein as "phenols." Likewise, polynuclear hydroxy aromatic hydrocarbons, such as the naphthols, can be used. From the standpoints of availability and economy, simple phenol is preferred. For the purpose of ease in description, phenol will be referred to in the following text; but it is to be understood that this is solely by way of example, and that the description applies to the other hydroxy aromatic hydrocarbons specified.

The olefin polymer having 18 to 30 carbon atoms in the molecule employed as a starting material is preferably a propylene polymer, although butylene polymer or a polymer of other low molecular weight olefin may be used. A very satisfactory method of preparing the propylene polymer is to polymerize propylene under pressure in the presence of a $BF_3 \cdot H_2O$ catalyst at a temperature of about 150° F., since this has been found to give a good yield of polymer in the $C_{18}$–$C_{30}$, and particularly $C_{18}$–$C_{26}$, range without excessive heavy polymer formation. The $BF_3 \cdot H_2O$ catalyst is prepared by saturating water with $BF_3$ by bubbling the $BF_3$ gas into the water in a vessel until no more of the gas will go into solution, as evidenced by the increased "fog" of escaping gas, or by use of a counter-current gas absorption tower held at about 8 mm. Hg pressure.

In the preparation of the polymer, a steel reactor equipped with a motor driven stirrer and heating jacket is conveniently employed. The reactor is first charged with the desired amount of boron trifluoride water catalyst, which is usually of the order of around 5–15% and preferably around 10% by weight of the propylene to be added. With heated water being circulated through the jacket of the reactor at a temperature of about 150° F., the propylene is fed into the reactor with stirring at a feeding pressure of approximately 100 pounds per square inch. Polymerization starts rapidly and the pressure in the reactor soon drops. The stirring is continued for the desired contact time, usually about two hours. The reactor is then drained, and the reaction mixture allowed to settle into an upper hydrocarbon layer and a lower catalyst layer. The hydrocarbon layer is then washed with an alkaline solution such as an aqueous sodium carbonate solution, until the wash layer remains strongly alkaline. The hydrocarbon product is then dried with anhydrous calcium chloride and filtered, using a filter-aid. After stabilizing on a steam bath, the resulting polymer may be fractionated under an absolute pressure of 1–2 mm. of mercury into cuts boiling between 100 and 220° C. of the desired average carbon atom content, to obtain the propylene polymer employed as a charge for the present alkylation reaction. Typical cuts and yields of propylene polymer obtained by the foregoing procedure are set forth in the following tabulation:

TABLE I

| Boiling Range (1–2 mm. Hg) | Volume Percent of Charge |
|---|---|
| 100–120° C | 7.2 |
| 120–140° C | 7.2 |
| 140–160° C | 8.1 |
| 160–180° C | 10.0 |
| 180–200° C | 7.9 |
| 200–220° C | 6.0 |
| Residue above 220° C | 12.0 |

Typical tests with respect to average carbon atom content and average molecular weight of the preferred cuts of propylene polymer are set forth in the following tabulation:

TABLE II

| Boiling Range, °C. | Average No. of Carbon Atoms | Average Molecular Weight |
|---|---|---|
| 100–120 | 18 | 252 |
| 120–140 | 20 | 280 |
| 140–160 | 23 | 322 |
| 160–180 | 26 | 364 |

It will be understood that broader or narrower cuts than the foregoing can be employed, if desired. In fact, a broad boiling range polymer fraction containing polymers having 18 to 30 carbon atoms in the molecule can be used. However, from the standpoint of product control and product quality as an intermediate in the preparation of metal alkyl phenolates for lubricating oil additives, it is generally preferred to utilize one of the cuts as listed above.

The HF catalyst employed should be substantially anhydrous. By this is meant that the catalyst should not have more than a small water content of the order of 1–2% by weight. Best results are secured when the catalyst is freshly distilled to separate from any water content, and is maintained in substantially anhydrous condition until employed in the alkylation reaction.

The following example is given in order to illustrate a preferred embodiment of the present invention:

Example 1

141 grams (1½ mols) of phenol, reagent grade, together with 126 grams (½ mol) of propylene polymer (boiling range 100–120° C. at 1.5 mm.) were mixed, and the mixture heated to melt the phenol. The liquid mixture was then drawn into the cold, evacuated, alkylation reactor equipped with a stainless steel stirrer, and having an oil seal for the stirrer shaft. 40 grams (2.0 mols) of HF were then distilled into the reactor and all lines to the reactor were closed. The reactor and contents were then brought to 150° F. and maintained at this temperature with constant stirring for one hour.

At the end of the alkylation period, heating was terminated and the stirrer stopped. The reaction mix was drained from the reactor into a 25% sodium carbonate solution or a 10% sodium hydroxide solution, containing at least enough base to neutralize all of the HF. The resulting organic layer was separated from the water layer, and the organic layer washed 4–5 times with hot water to remove unreacted and excess phenol. The organic layer was then heated on a steam hot plate until residual water had been removed. The crude product was then transferred to a vacuum still and topped to 170° C. at 1.5 mm. Hg absolute pressure. A residue of 951 grams of alkyl phenol product was obtained, which analyzed to a molecular weight of 397 and a hydroxyl number of 153. This represented a yield of 72.4% by weight of the theoretical yield.

A series of batch runs utilizing the same charge stocks and same procedure as outlined immediately above, except that conditions of temperature, reaction time, phenol to polymer mol ratio and HF to polymer mol ratio were varied, were made with the results as shown in the following Table III:

TABLE III

| | Temp., °F. | Contact time, Hrs. | Phenol/Polymer Mol Ratio | HF/Polymer Mol Ratio | Yield Percent of Theoretical |
|---|---|---|---|---|---|
| 1 | 70 | 1 | 3 | 4 | 64.7 |
| 2 | 100 | 1 | 3 | 4 | 70.8 |
| 3 | 125 | 1 | 3 | 4 | 68.8 |
| 4 | 150 | 1 | 3 | 4 | 70.7 |
| 5 | 175 | 1 | 3 | 4 | 70.6 |
| 6 | 200 | 1 | 3 | 4 | 65.9 |
| 7 | 150 | ¼ | 3 | 4 | 59.3 |
| 8 | 150 | ½ | 3 | 4 | 69.5 |
| 9 | 150 | 2 | 3 | 4 | 69.1 |
| 10 | 150 | 4 | 3 | 4 | 58.1 |
| 11 | 150 | 6 | 3 | 4 | 69.4 |
| 12 | 150 | 1 | 1 | 4 | 34.8 |
| 13 | 150 | 1 | 2 | 4 | 58.4 |
| 14 | 150 | 1 | 5 | 4 | 70.3 |
| 15 | 150 | 1 | 3 | 1 | 27.1 |
| 16 | 150 | 1 | 3 | 2 | 56.4 |
| 17 | 150 | 1 | 3 | 5 | 81.0 |
| 18 | 150 | 1 | 3 | 10 | 52.1 |
| 19 | 150 | ¼ | 5 | 4 | 59.0 |

Many of the run conditions of Table III were repeated from two to four times, and the figures given for yield in the table represent the average of the runs made under the same conditions. Thus, the conditions of the run of Example 1 above are those set forth in item 4 of Table III; and the yield figure of 70.7% listed is the average of 4 runs made under these particular conditions.

The results of the runs represented by items 1–5 inclusive of Table III are plotted in Fig. 1 of the drawing to more clearly illustrate the effect of temperature on yield, with other conditions being close to optimum. As shown, a temperature range of about 100–175° F. consistently gives yields of around 70% or better of theoretical, with about 125–150° F. being preferred. Item 6 of Table III is included to show that the yield has started to drop materially at a temperature of 200° F., as is also true at a temperature of 70° F. as shown by item 1.

Items 7–11 and 4 are plotted in Fig. 2 of the drawing to illustrate the effect of reaction time on the yield, with other conditions being close to optimum. As shown, the curve rises very sharply with an increasing reaction time up to about ½ hour, and then tapers off to an approximately flat curve with yields of around 70% for reaction times of ½ hour to six hours. From the practical standpoint, a reaction time of about ½ to 1 hour is preferred. Item 19 of the table shows that a reaction time of ¼ hour is too short to obtain high yield, with a phenol to polymer mol ratio of 5:1 and other conditions the same as in item 7.

Items 12–14 inclusive and 4 of Table III are plotted in Fig. 3 of the drawing to illustrate the effect of phenol to polymer mol ratio on yield, with other conditions approaching optimum. As shown, the curve rises sharply to a phenol to polymer mol ratio of about 3:1, reaching a peak between 3:1 and 5:1, and then tapering off. From a practical standpoint, including the necessity for handling and removing the excess unreacted phenol, a ratio of about 3:1 is preferred.

Items 15–18 inclusive and 4 of Table III are plotted in Fig. 4 of the drawing to illustrate the effect of the HF to polymer mol ratio on the yield, with other conditions approaching optimum. As shown, the curve rises very sharply up to about 3:1 and then starts to taper off to reach a decided peak at about 5:1, and then drops on the other side of the peak to a comparatively low yield. In order to attain yields of about 70% or better, ratios between about 3:1 and 8:1 are employed, with a ratio of around 5:1 being preferred. It will be noted that the runs plotted in Figs. 1–3 inclusive of the drawing were made with an HF to polymer mol ratio of 4:1; and from Fig. 4, it is evident that the level of the curves in Figs. 1–3 inclusive will be raised to the extent of about 10% in yield for a 5:1 HF to polymer mol ratio. It is evident that this ratio is one of the most critical of the reaction conditions.

A similar series of batch runs were made on cuts having a boiling range of 142–150° C. at 1.5 mm. Hg and 150–158° C. at 1.5 mm. Hg respectively of a $C_3$ polymer bottoms produced by a conventional plant scale polymerization of $C_3$ hydrocarbon charging stock in the presence of a supported phosphoric acid type catalyst. These runs also showed essentially the same critical conditions of operation for the present alkylation reaction as outlined above. In this case, a reaction time of about one-half hour with a 3:1 mol ratio of phenol to polymer and a 5:1 mol ratio of HF to polymer were again found to be optimum. However, a reaction temperature of around 125° F. gave best results with this polymer. A phenol to polymer mol ratio varying from 2:1 up to 6:1 gave consistently high yields, although the yields were at a somewhat lower level in all of the runs on this material, indicating that the actual olefinic content of this particular polymer was lower. Here again, the mol ratio of HF to polymer was found to be the most critical variable, with the yield dropping rather sharply on either side of a 5:1 ratio.

Since the foregoing runs indicated the value of a substantial excess of phenol to polymer in the reaction mix, additional runs were made to determine the effect of introducing the olefin polymer slowly into the reactor containing the phenol-HF mixture. The previously determined optimum conditions for temperature, contact time and HF to polymer mol ratio were employed. Following the charging of the phenol and HF into the reactor, the latter was heated to 150° F. with constant stirring. When he reactor was up to temperature, the olefin polymer (a cut of propylene polymer having a boiling range of 100–120° C. at 1.5 mm. Hg of the same character as employed in Table III) was charged by means of nitrogen pressure at a rate of 1 cc. per minute. When all of the polymer had been charged, the reaction temperature was maintained at 150° F. for ½ hour with constant stirring. The quantity of reactants were selected to provide a final phenol to polymer mol ratio of 3:1 and a final HF to polymer mol ratio of 5:1 or 4:1 respectively. The reaction mix was then finished to recover the alkyl phenol in the manner previously described.

Typical results secured in these last mentioned runs are set forth in the following Table IV:

TABLE IV

| Temp., °F. | Contact time, Hrs. | Phenol/Polymer Mol Ratio | HF/Polymer Mol Ratio | Yield Percent of Theoretical |
|---|---|---|---|---|
| 150 | ½+ | 3 | 5 | 56.0 |
| 150 | ½+ | 3 | 4 | 55.4 |

As shown, this procedure does not give the desired high yield which is secured by premixing of the phenol with the olefin polymer prior to adding the HF catalyst. It is postulated that the HF combines more readily with the phenol than with a phenol-polymer mixture, and that this is responsible for the reduced yield of desired alkyl phenol and also results in increased consumption of catalyst. In any event, the premixing of the phenol with the olefin polymer prior to contact with the HF catalyst is critical in producing the desired high yield of good quality alkyl phenol.

In the foregoing batch runs, the reaction mix was neutralized with no attempt being made to recover the HF catalyst. However, additional runs were made wherein the reaction mix, following the completion of the alkylation reaction, was distilled at atmospheric pressure and a temperature of 212° F. with recovery of approximately 98% of the HF. This recovered catalyst was reused for further alkylation, and gave the same high yields of good quality product as the fresh catalyst. Further, when the reaction mix is allowed to stand in a quiescent state, it readily separates into a lower HF layer and an upper organic layer. In this manner, the bulk of the HF can be separated for recycling in the process. The organic layer is then distilled under the above conditions to recover an additional small quantity of HF retained in the organic layer.

This phenol-olefin polymer alkylation reaction can also be carried out continuously with the same satisfactory results. This is illustrated in Fig. 5 of the drawing, which shows a contactor 10 of the external or internal recirculating type having a small stream draw-off 11 to a settler 12 in accordance with the rate of fresh feed, the latter including the premixed phenol and olefin polymer by line 13 and the make-up and recycle HF catalyst by line 14. It will be understood that the reactor is of such size, and is so coordinated with the rate of feed, as to provide the desired average reaction time as previously indicated.

The resulting reaction mix is allowed to settle in settler 12 to effect separation of the bulk of the HF as a lower acid layer, which can be recycled by line 15 to the contactor 10. A stream of the upper organic layer is drawn off from settler 12 by line 16 to the HF stripper 17 operating at atmospheric pressure and about 212° F. Here any remaining HF is removed overhead by line 18 for condensation and recycling to the reactor. Bottoms from stripper 17 are passed by line 19 to a phenol stripper 20 operating at atmospheric pressure and about 250° F. for removal of unreacted and excess phenol by overhead line 21 for condensation and recycling to the reactor.

The crude alkyl phenol bottoms is removed from stripper 20 by line 22 and subjected to neutralization and water washing in conventional equipment (not shown), and then passed to vacuum still 23 operated at a high vacuum of about 1–2 mm. Hg absolute pressure and a temperature approximately 50° C. higher than the end boiling point of the olefin polymer cut employed. Here, any remaining polymer is removed overhead by line 24 for recycling to the reactor; and the desired alkyl phenol product is discharged as bottoms by line 25.

While HF has heretofore been suggested for the alkylation of aromatic and hydroxy aromatic hydrocarbons with olefin polymers of lower molecular weight, the operating conditions proposed for such reaction with the lower molecular weight olefin polymers are unsuitable for the present reaction involving high molecular weight olefin polymers within the $C_{18}$ to $C_{30}$ range, in order to obtain good yields of high quality product. Moreover, it was not to be anticipated that this catalyst would prove markedly superior for this phenol-high molecular weight olefin polymer alkylation reaction when carried out under the critical conditions herein disclosed.

Obviously many modifications and variations of the invention, as hereinbefore set forth, may be made without departing from the spirit and scope thereof and, therefore, only such limitations should be imposed as are indicated in the appended claim.

I claim:

The method in the manufacture of a $C_{18}$ to $C_{30}$ monoalkyl phenol suitable as an intermediate in the preparation of zinc and magnesium alkyl phenolates having satisfactory quality as lubricating oil additives, which comprises mixing phenol with a narrow boiling range propylene polymer fraction exclusively within the $C_{18}$ to $C_{30}$ range and substantially free from non-hydrocarbon material as well as normal non-branched chain olefins in the ratio of about 3 to 6 mols of phenol to one mol of the propylene polymer fraction, adding to the mixture substantially anhydrous liquid HF in an amount equivalent to about 3 to 8 mols of HF per mol of the propylene polymer fraction, heating and stirring the resulting mixture at a temperature of 100–175° F. for at least about ½ hour in the substantial absence of other added material, and separating from the reaction mixture as the principal reaction product a nuclearly mono-alkylated phenol wherein the alkyl substituent on the ring is the branched chain propylene polymer group containing from 18 to 30 carbon atoms, the yield of said principal reaction product constituting in excess of 65% of theoretical based on the propylene polymer fraction charged.

References Cited in the file of this patent

UNITED STATES PATENTS

| | | |
|---|---|---|
| 2,275,312 | Tinker et al. | Mar. 3, 1942 |
| 2,349,211 | Tulleners | May 16, 1944 |
| 2,423,470 | Simons | July 8, 1947 |
| 2,437,356 | Hill | Mar. 9, 1948 |
| 2,477,382 | Lewis | July 26, 1949 |
| 2,558,838 | Goodson | July 3, 1951 |
| 2,564,072 | Lien et al. | Aug. 14, 1951 |
| 2,655,544 | McNulty et al. | Oct. 13, 1953 |